(12) United States Patent
Oda et al.

(10) Patent No.: US 10,197,461 B2
(45) Date of Patent: Feb. 5, 2019

(54) DEVICE FOR CUTTING SUBSTRATE AND ROBOT

(71) Applicant: FANUC CORPORATION, Minamitsuru-gun, Yamanashi (JP)

(72) Inventors: Masaru Oda, Yamanashi (JP); Yoshinori Ochiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/881,645

(22) Filed: Oct. 13, 2015

(65) Prior Publication Data

US 2016/0103029 A1  Apr. 14, 2016

(30) Foreign Application Priority Data

Oct. 14, 2014 (JP) .................. 2014-210163

(51) Int. Cl.
| | |
|---|---|
| *G01L 5/00* | (2006.01) |
| *B26D 1/45* | (2006.01) |
| *B26D 5/00* | (2006.01) |
| *B26D 5/08* | (2006.01) |
| *B26D 5/12* | (2006.01) |

(52) U.S. Cl.
CPC .............. *G01L 5/0038* (2013.01); *B26D 1/45* (2013.01); *B26D 5/00* (2013.01); *B26D 5/086* (2013.01); *B26D 5/12* (2013.01); *G01L 5/0076* (2013.01)

(58) Field of Classification Search
CPC . B26D 1/45; B26D 1/455; B26D 5/00; B26D 5/086; B26D 5/12; Y10T 83/531; Y10T 83/536; Y10T 83/538; Y10T 83/541

USPC ............... 83/27, 360–372, 468.8–468.94
See application file for complete search history.

(56) References Cited

U.S. PATENT DOCUMENTS

| | | | | | |
|---|---|---|---|---|---|
| 3,791,248 | A | * | 2/1974 | Pearson | B23D 33/00 83/641 |
| 4,050,338 | A | * | 9/1977 | Pearson | B23D 35/005 74/110 |
| 4,416,176 | A | | 11/1983 | Forthmann | |
| 4,809,573 | A | * | 3/1989 | Welch | B05D 1/202 83/295 |
| 6,095,023 | A | * | 8/2000 | Harada | B26D 3/085 83/152 |

(Continued)

FOREIGN PATENT DOCUMENTS

| | | |
|---|---|---|
| DE | 1819248 U | 10/1969 |
| DE | 60112648 T2 | 2/2006 |

(Continued)

*Primary Examiner* — Jason Daniel Prone
*Assistant Examiner* — Richard Crosby, Jr.
(74) *Attorney, Agent, or Firm* — RatnerPrestia

(57) ABSTRACT

Provided is a cutting device that prevents a variation of shocks or impacts applied to a substrate during a cutting operation. The cutting device includes a pressing part; a cutting part disposed so as to move with respect to the pressing part so as to contact the substrate on an opposite side of the pressing part to thereby sandwich the substrate between the cutting part and the pressing part to shear the substrate; a first force generation part for generating pressing force to press the pressing part against the substrate; and a first adjustment part for adjusting the pressing force in response to the force applied from the substrate to the pressing part when the pressing part presses the substrate with the first force generation part.

12 Claims, 12 Drawing Sheets

(56) References Cited

U.S. PATENT DOCUMENTS

| | | | | |
|---|---|---|---|---|
| 6,688,198 B2 * | 2/2004 | Matsumoto | .......... | B26D 1/0006 83/139 |
| 7,926,396 B2 * | 4/2011 | Cote | .......... | B26D 1/09 83/110 |
| 8,276,280 B2 * | 10/2012 | Lee | .......... | A01G 3/037 200/505 |
| 8,312,801 B2 * | 11/2012 | Sundquist, III | ...... | B23D 35/005 83/640 |
| 8,453,548 B2 * | 6/2013 | Jaynes | .......... | B26D 1/085 83/385 |
| 8,505,423 B2 * | 8/2013 | Hedtke | .......... | B26D 3/08 83/109 |
| 8,806,999 B2 * | 8/2014 | Tanaka | .......... | B26D 1/0006 409/297 |
| 8,943,940 B2 * | 2/2015 | Hedtke, Jr. | .......... | B26D 5/20 73/468 |
| 2006/0150795 A1 * | 7/2006 | Mochizuki | .......... | B26D 5/007 83/669 |
| 2008/0028904 A1 * | 2/2008 | Arikita | .......... | B26D 7/018 83/24 |
| 2009/0000440 A1 * | 1/2009 | Graushar | .......... | B26D 1/085 83/52 |
| 2009/0165626 A1 * | 7/2009 | Sundquist | .......... | B23D 35/005 83/699.41 |
| 2009/0290959 A1 * | 11/2009 | Hata | .......... | B26D 5/02 412/33 |
| 2010/0065599 A1 * | 3/2010 | Nishisaka | .......... | B28D 1/222 225/96.5 |
| 2011/0044786 A1 * | 2/2011 | Marsh | .......... | B26D 1/08 412/1 |
| 2012/0285303 A1 * | 11/2012 | Porat | .......... | B26D 1/08 83/39 |
| 2013/0139665 A1 * | 6/2013 | Sperry | .......... | B26D 7/32 83/77 |

FOREIGN PATENT DOCUMENTS

| | | |
|---|---|---|
| GB | 785254 | 10/1957 |
| JP | 64-040209 | 2/1989 |
| JP | H 05-185396 A | 7/1993 |
| JP | 2001-053417 | 2/2001 |
| JP | 2001-315023 A | 11/2001 |

* cited by examiner

DEVICE FOR CUTTING SUBSTRATE AND ROBOT

BACKGROUND ART

1. Technical Field

The invention relates to a device for cutting substrates, and a robot.

2. Description of the Related Art

Certain known device for cutting substrates includes a pressing part for pressing a substrate, a first cutter that contacts the substrate on one side thereof, and a second cutter that contacts the substrate on the other side thereof to sandwich and shear the substrate between the first cutter and the second cutter (for example, Japanese Laid-open Patent Publication No. 2001-315023).

A conventional cutting device is undesirably liable to press each substrate with inconsistent pressing force during a cutting process of substrates, caused by the substrates having different thickness. Inconsistent pressing force applied to the substrates causes the substrates to receive various shocks or impacts during the cutting process, adversely affecting the performance of components mounted on the substrates.

SUMMARY OF THE INVENTION

According to an aspect of the invention, a cutting device for cutting a substrate includes a pressing part and a cutting part. The cutting part is provided so as to be movable with respect to the pressing part, and contact the substrate from a side opposite the pressing part. The cutting part sandwiches the substrate between the cutting part and the pressing part so as to shear the substrate.

The cutting device further includes a first force generation part which generates a pressing force for pressing the pressing part against the substrate at the pressing part; and a first adjustment part which adjusts the pressing force in response to a force applied from the substrate to the pressing part when the pressing part is pressed against the substrate by the first force generation part.

The cutting device may further include a force sensor which measures the force applied from the substrate. The first adjustment part may control the first force generation part so as to adjust the pressing force based on the force applied from the substrate, measured by the force sensor.

The cutting device may further include a displacement sensor which measures a position of the pressing part with respect to the substrate. The first adjustment part may control the first force generation part so as to adjust the pressing force based on the position measured by the displacement sensor. The first force generation part may include an air cylinder which generates the pressing force. The first adjustment part may adjust a pressure of an air supplied to the air cylinder.

The first force generation part may include a spring which generates the pressing force; and a moving part which is movable in directions toward and away from the substrate. The pressing part may be connected to the moving part via the spring. The first adjustment part may adjust a position of the moving part with respect to the substrate.

The cutting device may further include a second force generation part which generates a driving force for shearing the substrate at the cutting part; and a second adjustment part which adjusts the driving force. The second force generation part may include an air cylinder. The second adjustment part may control the pressure of an air supplied to the air cylinder.

The second force generation part may include a servomotor. The second adjustment part may control the torque of the servo motor. The second adjustment part may adjust the driving force in response to the thickness of the substrate. The cutting part may include a saw blade.

According to another aspect of the invention, a robot includes a robot arm and the cutting device described above. The pressing part is provided at the robot arm. The first force generation part moves the pressing part in directions toward and away from the substrate by an operation of the robot arm. According to still another aspect of the invention, a robot system includes the robot described above and a controller which controls the robot.

BRIEF DESCRIPTION OF THE DRAWINGS

The foregoing or other objects, features and advantages of the invention will be clarified by the following description of a preferred embodiment with reference to the accompanying drawings, in which.

DETAILED DESCRIPTION OF THE INVENTION

Figure 1:
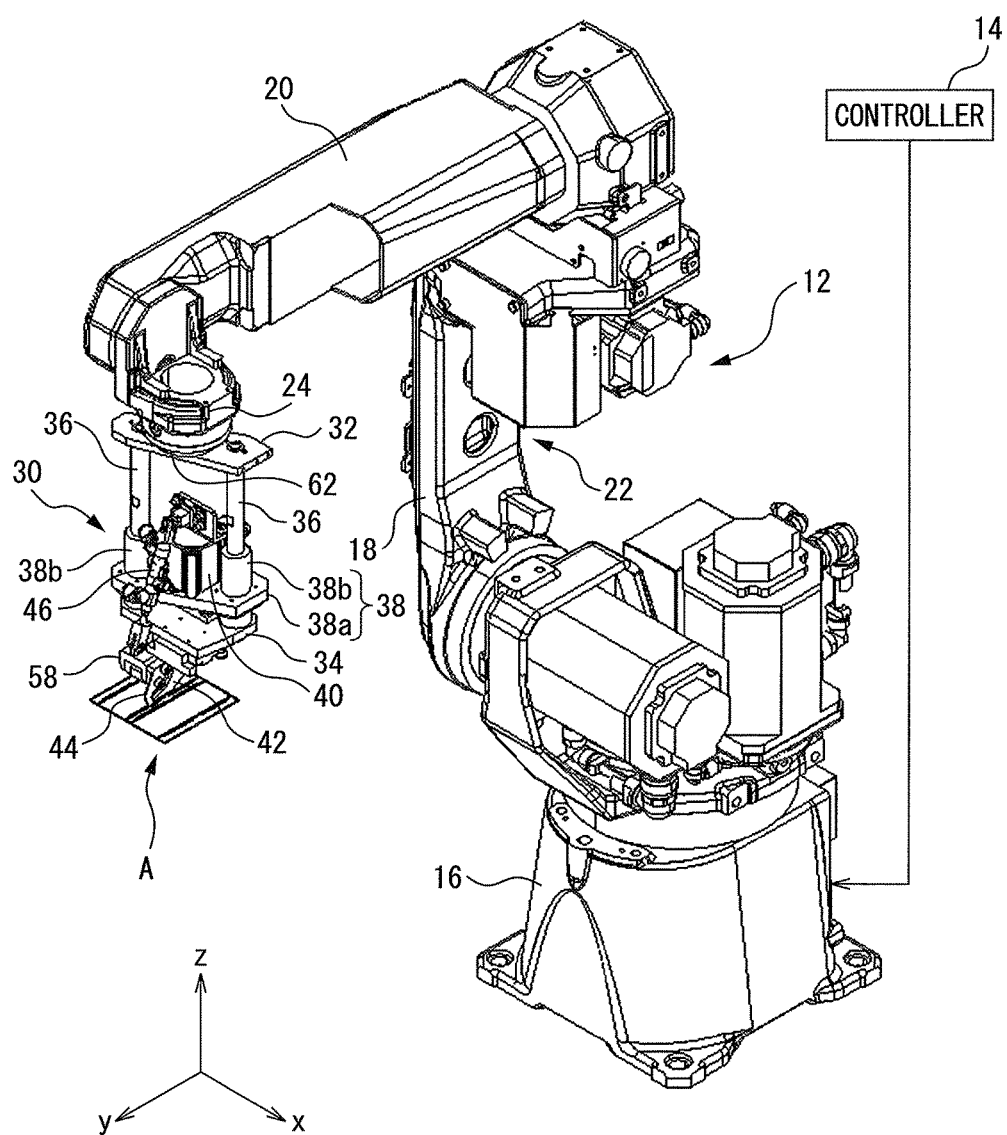
FIG. 1 shows a robot system of an embodiment of the invention.
Figure 2:
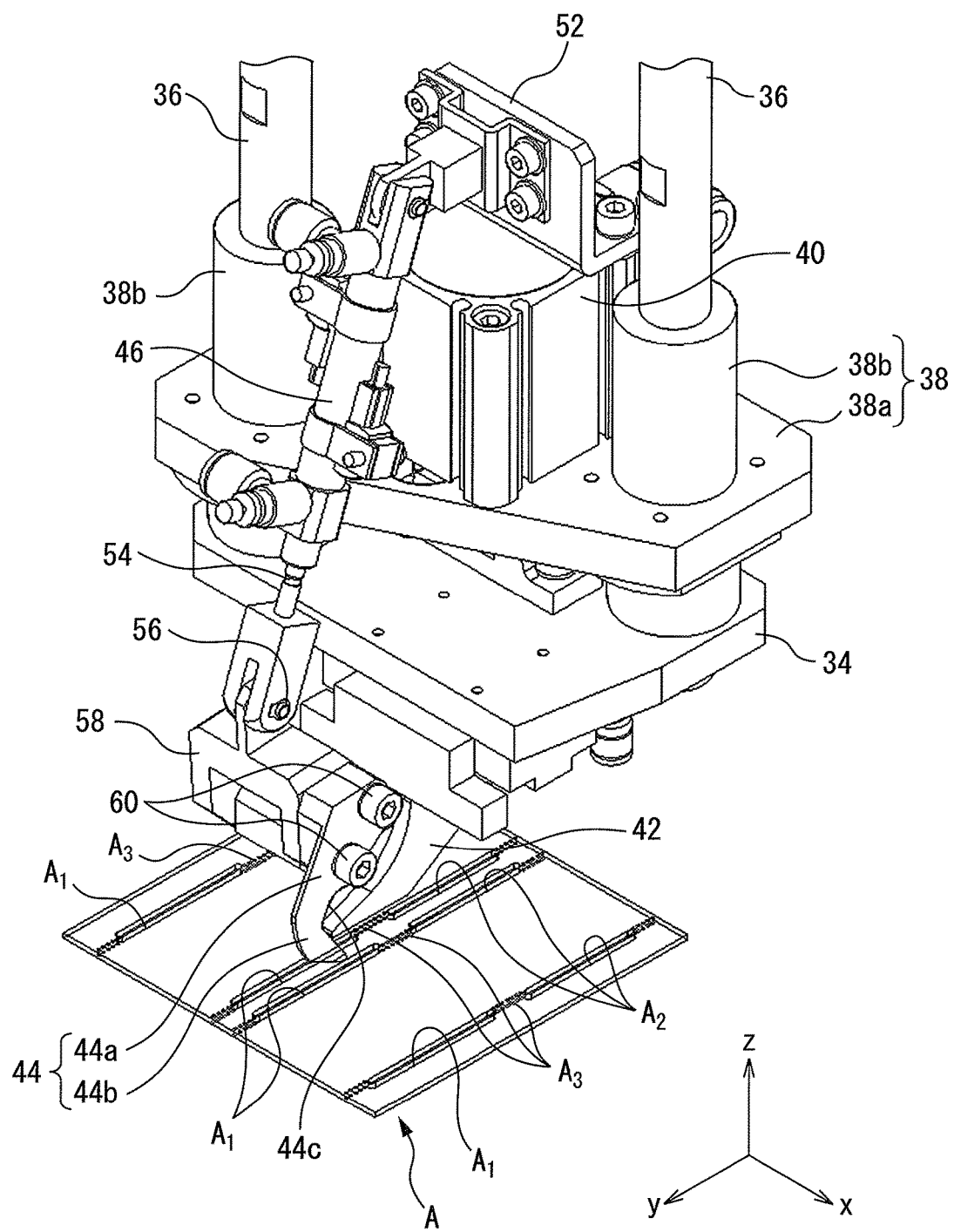
FIG. 2 is a partially enlarged view of the robot system shown in FIG. 1.

Embodiments of the invention will be described in detail below with reference to the drawings. First, referring to FIGS. 1 and 2, a robot system 10 according to an embodiment of the invention will be described. For the sake of easier understanding of the following description, x-axis, y-axis and z-axis are defined as shown in FIGS. 1 and 2. In addition, for convenience, the x-axis positive direction is referred as a right direction, the y-axis positive direction is referred as a frontward direction, and the z-axis positive direction is referred as an upward direction.

The robot system 10 is for cutting a substrate A. The robot system 10 includes a robot 12 and a controller 14 which controls the robot 12. The controller 14 directly or indirectly controls each of components which constitute the robot 12.

In the present embodiment, the robot 12 is a vertical articulated robot having multiple axes. Specifically, the robot 12 comprises a robot arm 22 including a lower arm 18 attached to a revolving drum 16 and a front arm 20 attached to the lower arm 18; and a cutting device 30.

The cutting device 30 is attached to the front arm 20 via a wrist 24 attached to a distal end of the front arm 20. Specifically, the cutting device 30 includes an attachment plate 32, a pedestal plate 34, support shafts 36, a movable part 38, and a first air cylinder 40.

The attachment plate 32 is attached to the wrist 24. The pedestal plate 34 is disposed below the attachment plate 32 so as to be separated away from the attachment plate 32, and is fixed relative to the attachment plate 32. The support shafts 36 vertically extend between the attachment plate 32 and the pedestal plate 34. The support shafts 36 are fixed to the attachment plate 32 at their upper ends, while the support shafts 36 support the pedestal plate 34 at their lower ends. In the present embodiment, a total of two support shafts 36 are provided.

The movable part 38 is slidably fitted to the support shafts 36. Specifically, the movable part 38 includes a main plate 38a and two cylindrical parts 38b provided at the main plate 38a. Each of the support shafts 36 is inserted into each of the cylindrical parts 38b, whereby the movable part 38 is slidable along the support shafts 36 in the vertical direction.

The first air cylinder 40 is disposed on the movable part 38, and includes a cylinder shaft (not shown) mechanically connected to the pedestal plate 34. The first air cylinder 40 pushes the pedestal plate 34 in the lower direction via the cylinder shaft by increasing the pressure of the air supplied to the first air cylinder 40.

The cutting device 30 further includes a pressing part 42, a cutting part 44, and a second air cylinder 46. The proximal end of the pressing part 42 is fixed to the lower side of the pedestal plate 34. The pressing part 42 curvedly extends in the frontward and downward from the proximal end thereof, and has at a distal end thereof a cutting surface 42a (FIG. 7) arranged to face downward. In the present embodiment, the cutting surface 42a is a plane arranged to be substantially parallel to the x-y plane.

The cutting part 44 is supported by the movable part 38 via a support 48 (FIG. 7) fixed to the movable part 38. Specifically, the cutting part 44 is pivotally supported by a pin 50 (FIG. 7) provided at a distal end of the support 48, and is arranged adjacent to the pressing part 42 at right side of the pressing part 42.

The cutting part 44 curvedly extends in a substantially L-shape, and includes a proximal part 44a and a distal part 44b extending from the distal end of the proximal part 44a so as to be slanted with respect to the proximal part 44a. The distal part 44b is formed with a cutting surface 44c (FIG. 7) arranged to face upward. In the present embodiment, the cutting surface 44c is substantially a plane. The cutting surface 44c may have a saw blade.

The second air cylinder 46 is attached to the movable part 38 via an attachment 52 fixed to the movable part 38. The second air cylinder 46 includes a cylinder shaft 54. The cylinder shaft 54 moves in an axial direction thereof, in response to the increase or decrease in the pressure of the air supplied into the second air cylinder 46.

A cam 58 is rotatably attached to the distal end of the cylinder shaft 54 via a pin 56. The cam 58 is pivotally supported by the pin 56 fixed to the distal end of the cylinder shaft 54 so as to be rotatable about the pin 56. The above-mentioned proximal part 44a of the cutting part 44 is fixed to the cam 58 via bolts 60.

The cutting part 44 rotates about the pin 50 by the action of the second air cylinder 46 and the cam 58. Such operation of the cutting part 44 will be described below. When the air pressure inside the second air cylinder 46 is increased, the cylinder shaft 54 is pushed downward in the axial direction thereof.

The downward movement of the cylinder shaft 54 is transmitted to the cutting part 44 through the cam 58. On the other hand, the cutting part 44 is pivotally supported by the pin 50 fixed to the support 48, so the downward movement of the cutting part 44 is restricted by the pin 50. As a result, the cam 58 rotates about the pin 56, whereby the cutting part 44 rotates about the pin 50.

The cutting device 30 further includes a force sensor 62; a first force generation part which generates a pressing force for pressing the pressing part 42 against a substrate A at the pressing part 42; and a first adjustment part which adjusts the pressing force.

In the present embodiment, the force sensor 62 is disposed between the attachment plate 32 and the wrist 24, and measures the force applied between the attachment plate 32 and the wrist 24. The force sensor 62 is connected to the controller 14, and transmits a signal of the measured force to the controller 14. The functions of the force sensor 62, the first force generation part, and the first adjustment part will be described later.

Next, referring to FIG. 2, the substrate A will be described briefly. The substrate A is placed on a jig (not shown) during a cutting operation. At the substrate A, elongated openings $A_1$ and $A_2$ extending in a direction are formed in advance. The cutting device 30 according to the present embodiment cuts parts $A_3$ of the substrate A, each of which is located between the openings $A_1$ and $A_2$. When cutting the substrate A by the cutting device 30, the substrate A is placed on the jig so that the longitudinal directions of openings $A_1$ and $A_2$ match with the y-axial direction.

Next, referring to FIGS. 1 to 10, the operation of the robot system 10 will be described below. Note that, in FIGS. 7 to 10, the substrate A is shown by a dotted line in view of easy understanding. The flow shown in FIG. 3 starts when the controller 14 receives a command to start a cutting operation on the substrate A from an operator.

At step S1, the controller 14 presses the pressing part 42 against the substrate A. This step S1 will be described below with reference to FIG. 4. When step S1 is started, at step S11, the controller 14 positions the pressing part 42 above the substrate A.

Figure 7:
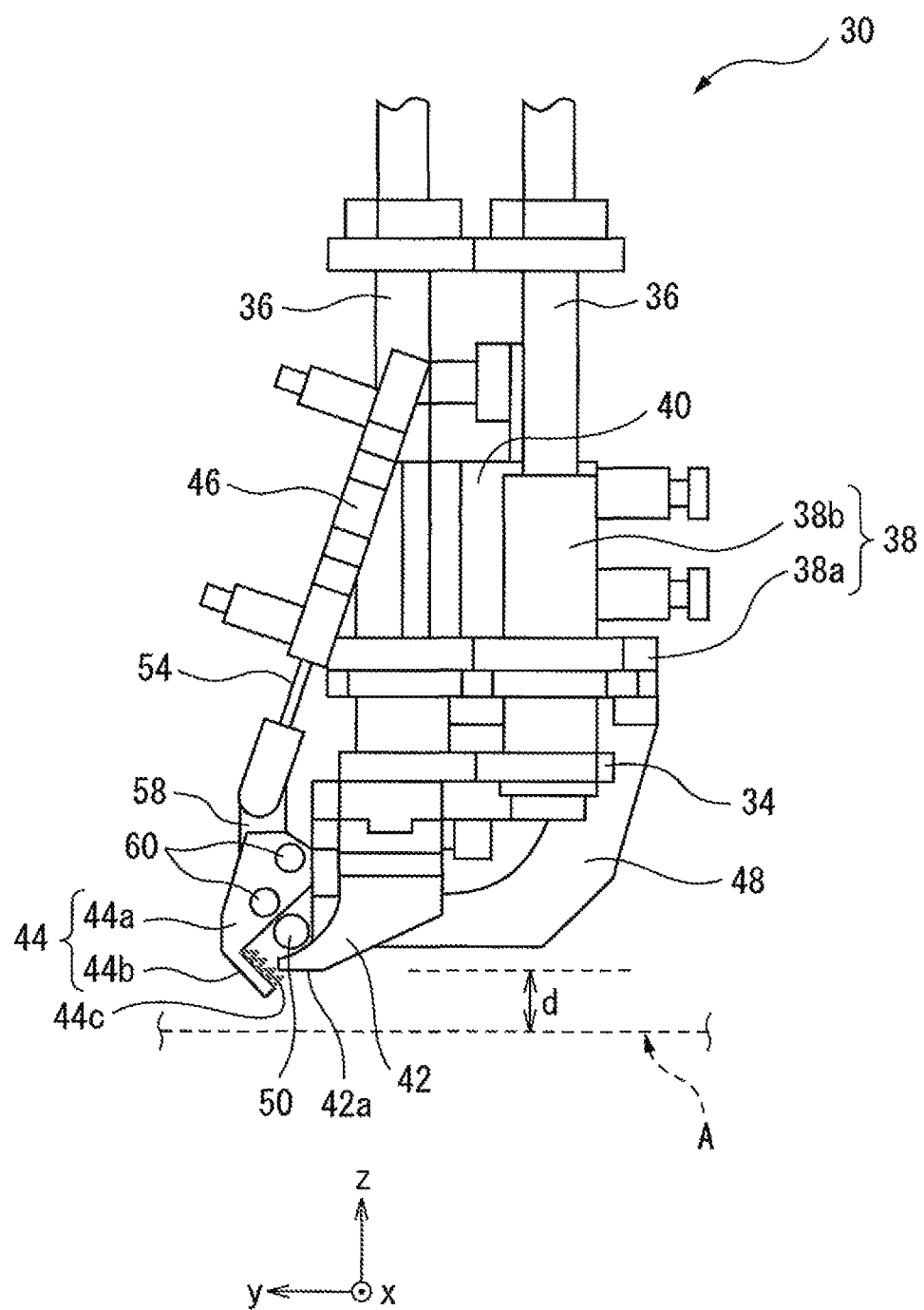
FIG. 7 shows a positional relation between the cutting device and the substrate at a time when step S11 in FIG. 4 is ended.

Specifically, the controller 14 operates the robot arm 22 in accordance with a robot program so as to move the pressing part 42 to a predetermined pre-operation position above the substrate A. This state where the pressing part 42 is positioned at the pre-operation position is shown in FIG. 7. In this state, the cutting surface 42a of the pressing part 42 is arranged so as to be separated upward from the substrate A by a predetermined distance "d".

At step S12, the controller 14 operates the robot arm 22 to move the pressing part 42 downward so as to approach the substrate A. At step S13, the controller 14 determines whether or not the pressing part 42 contacts the substrate A.

As an example, the controller 14 may determine that the pressing part 42 contacts the substrate A when the load torque of the servomotor (not shown) built in the robot arm 22 exceeds a predetermined value.

As another example, the controller 14 may include a storage (not shown) therein, which pre-store the distance "d" between the pressing part 42 at the pre-operation position and the substrate A. In this case, the controller 14 may determine that the pressing part 42 contacts the substrate A when moving the pressing part 42 downward by the distance "d" (or a predetermined distance longer than the distance "d").

Figure 8:
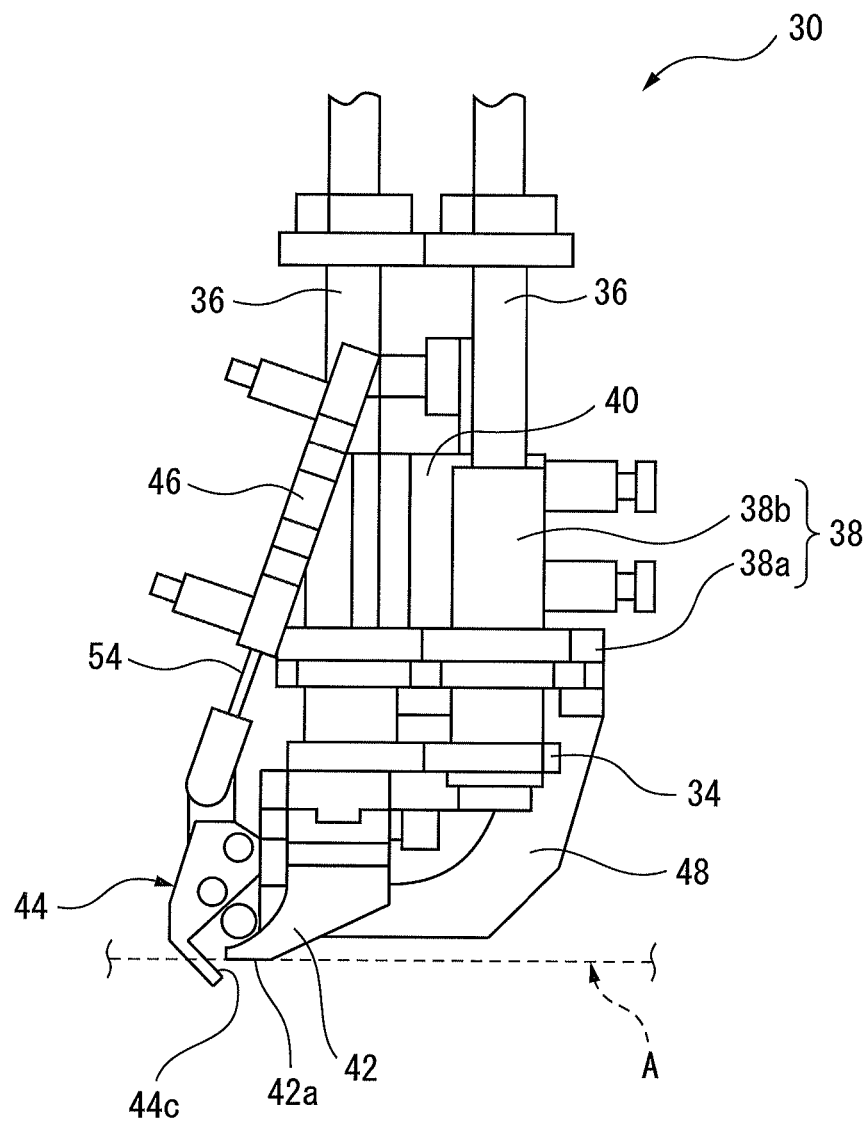
FIG. 8 shows a positional relation between the cutting device and the substrate at a time when determined "YES" at step S13 in FIG. 4.

When determined that the pressing part 42 contacts the substrate A (i.e., determined "YES" at step S13), the controller 14 proceeds to step S14. The state at this time is shown in FIGS. 2 and 8. In this state, the cutting surface 42a of the pressing part 42 contacts an upper surface of the substrate A, and is pressed against the substrate A with a pressing force of a predetermined magnitude.

At this time, as shown in FIG. 2, the pressing part 42 is arranged adjacent to the left side of the part $A_3$ to be cut, and the distal part 44b of the cutting part 44 is inserted into the opening $A_1$ formed at front side of the part $A_3$.

Thus, in the present embodiment, the pressing part 42 is pressed against the substrate A with the pressing force of the predetermined magnitude by the operation of the robot arm 22. Accordingly, the robot arm 22 functions as a first force generation part which generates the pressing force at the pressing part 42. On the other hand, when determined that the pressing part 42 does not contact the substrate A (i.e., determined "NO") at step S13, the controller 14 loops step S13.

At step S14, the controller 14 determines whether or not the force applied from the substrate A to the pressing part 42 is within a predetermined range. Specifically, the controller 14 determines whether or not the value of the force measured by the force sensor 62 is within a predetermined range.

This operation will be described more specifically below. When pressing the substrate A by the pressing part 42 with the predetermined pressing force, the pressing part 42 is pushed back from the substrate by a reaction force of the pressing force. The reaction force applied from the substrate A to the pressing part 42 acts on a section between the attachment plate 32 and the wrist 24, so the force sensor 62 can measure this reaction force.

Thus, the pressing force and the reaction force correlate with each other, and the value of the force measured by the force sensor 62 correlates with the pressing force and the reaction force. In the present embodiment, the controller 14 determines whether or not the pressing part 42 presses the substrate A with the pressing force of the magnitude within the predetermined range, by judging whether the value of the force obtained by the force sensor 62 is within the predetermined range.

The predetermined range set for the value of the force obtained by the force sensor 62 can be acquired by an experimental method, and is pre-stored in the storage built in the controller 14, for example.

Figure 3:
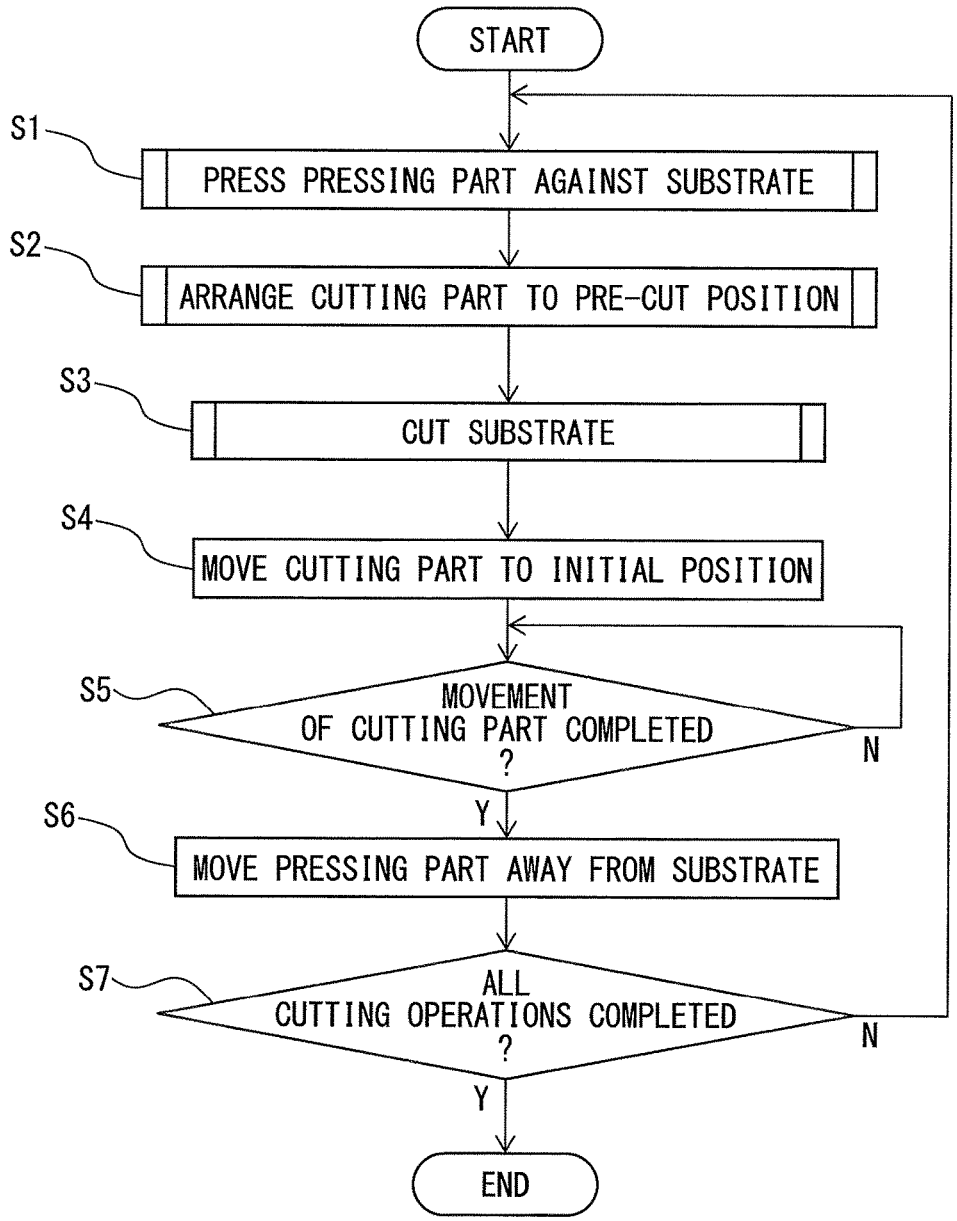
FIG. 3 is a flowchart illustrating an operational flow of the robot system shown in FIG. 1.
Figure 4:
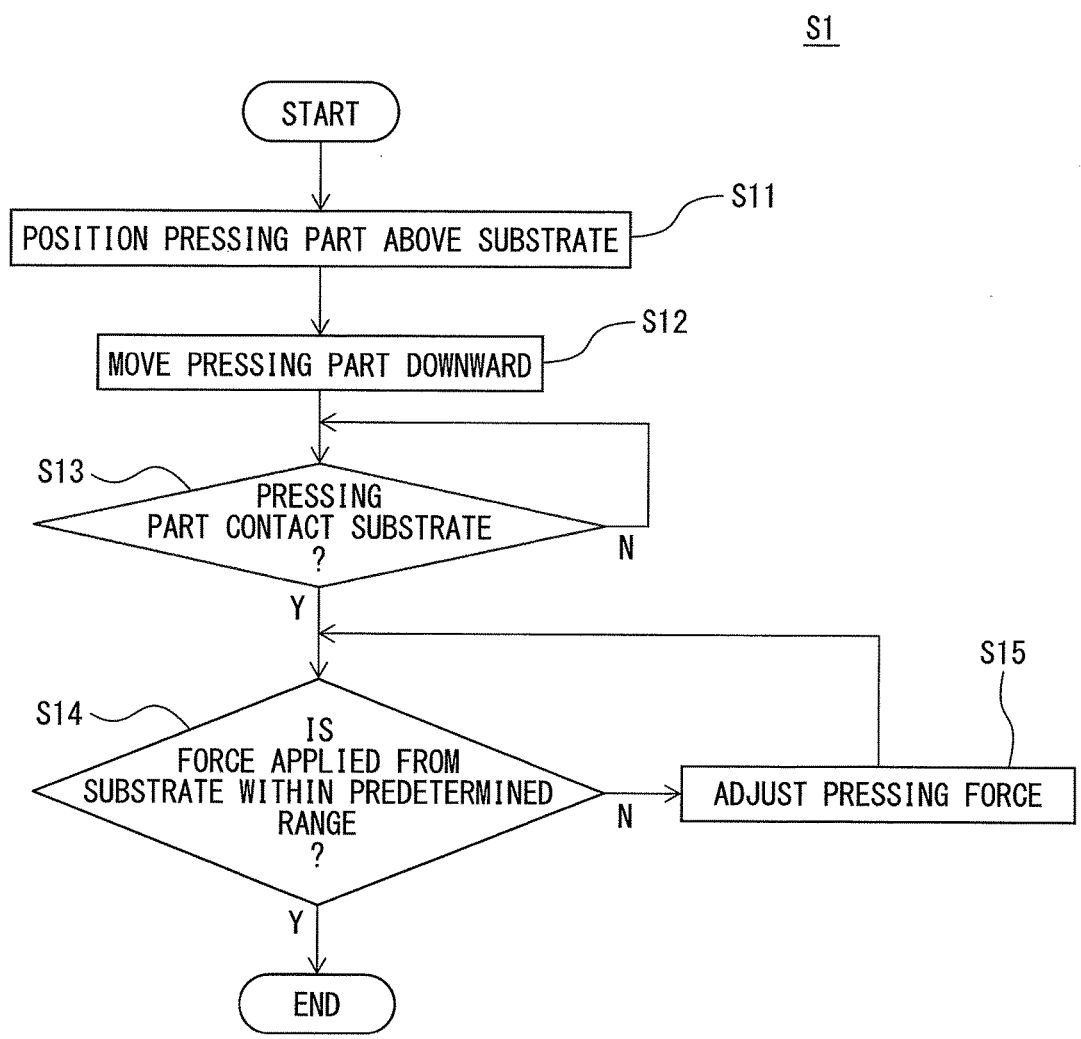
FIG. 4 is a flowchart of step S1 shown in FIG. 3.
Figure 5:
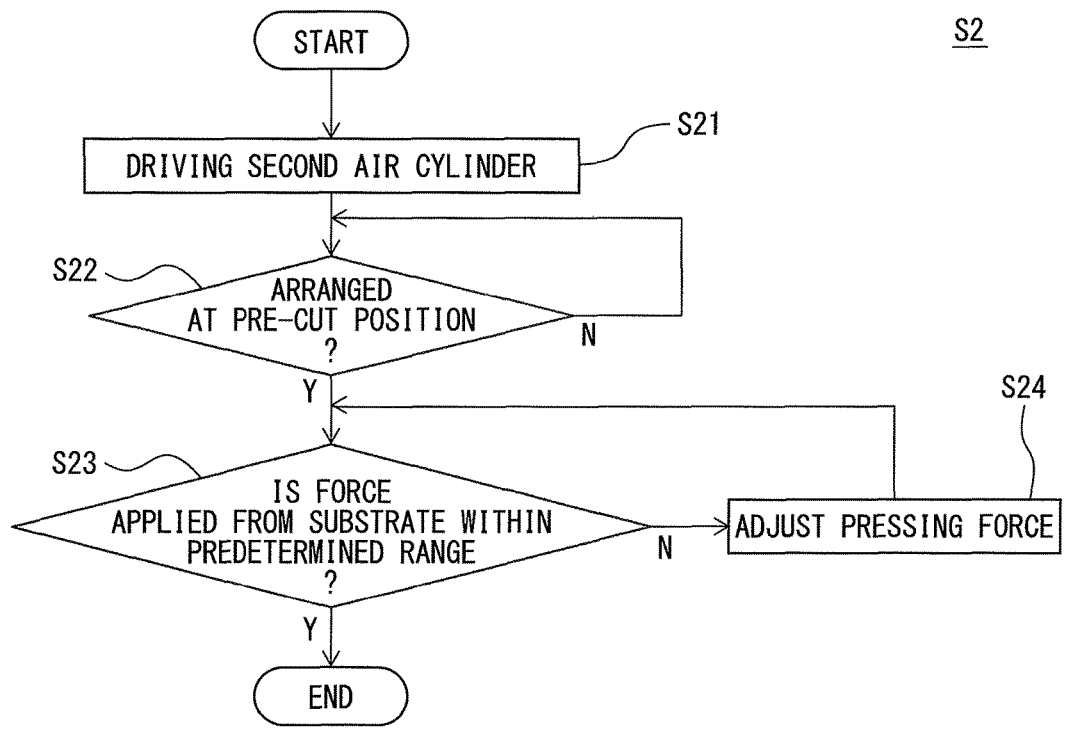
FIG. 5 is a flowchart of step S2 shown in FIG. 3.

When the value of the force obtained by the force sensor 62 is within the predetermined range, the controller 14 determines "YES", and ends the flow shown in FIG. 4, and then proceeds to step S3 shown in FIG. 3. On the other hand, when the value of the force obtained by the force sensor 62 is out of the predetermined range, the controller 14 determines "NO", and proceeds to step S15.

At step S15, the controller 14 adjusts the pressing force applied to the substrate A from the pressing part 42. Specifically, when the value of the force obtained by the force sensor 62 is determined to be larger than the upper limit of the predetermined range at the step S14, the controller 14 operates the robot arm 22 so as to move the pressing part 42 slightly upward. By this operation, the pressing force by which the pressing part 42 presses the substrate A can be reduced.

On the other hand, when the value of the force obtained by the force sensor 62 is determined to be smaller than the lower limit of the predetermined range at step S14, the controller 14 operates the robot arm 22 so as to move the pressing part 42 slightly downward.

By this operation, the pressing force by which the pressing part 42 presses the substrate A can be increased. In this manner, the controller 14 loops step S14 and step S15 until the value of the force obtained by the force sensor 62 falls within the predetermined range.

Thus, in the present embodiment, the controller 14 controls the operation of the robot arm 22 so as to adjust the pressing force for pressing the substrate A by the pressing part 42, in response to the force obtained by the force sensor 62, i.e., the reaction force applied from the substrate A to the pressing part 42. Accordingly, the controller 14 functions as a first adjustment part which adjusts the pressing force in response to the force applied from the substrate A to the pressing part 42.

Referring to FIG. 3 again, at step S2, the controller 14 arranges the cutting part 44 to a pre-cut position. This step S2 will be described below with reference to FIG. 5. When step S2 is started, at step S21, the controller 14 drives the second air cylinder 46.

Specifically, the controller 14 makes an air supply device (not shown) externally installed to supply an air into the first air cylinder 46 so as to increase the air pressure inside the first air cylinder 46, whereby pushes out the cylinder shaft downwardly. The movement of the cylinder shaft 54 is transmitted to the cutting part 44 via the cam 58, whereby the cutting part 44 is rotated about the pin 50 in a counter clockwise direction when seen from obverse side of FIG. 8, in the opening $A_1$ of the substrate A.

At step S22, the controller 14 determines whether or not the cutting part 44 is arranged at the predetermined pre-cut position. For example, the controller 14 determines whether the cutting part 44 is arranged at the pre-cut position, based on the air pressure inside the second air cylinder 46 or the amount of movement of the cylinder shaft 54.

Figure 9:
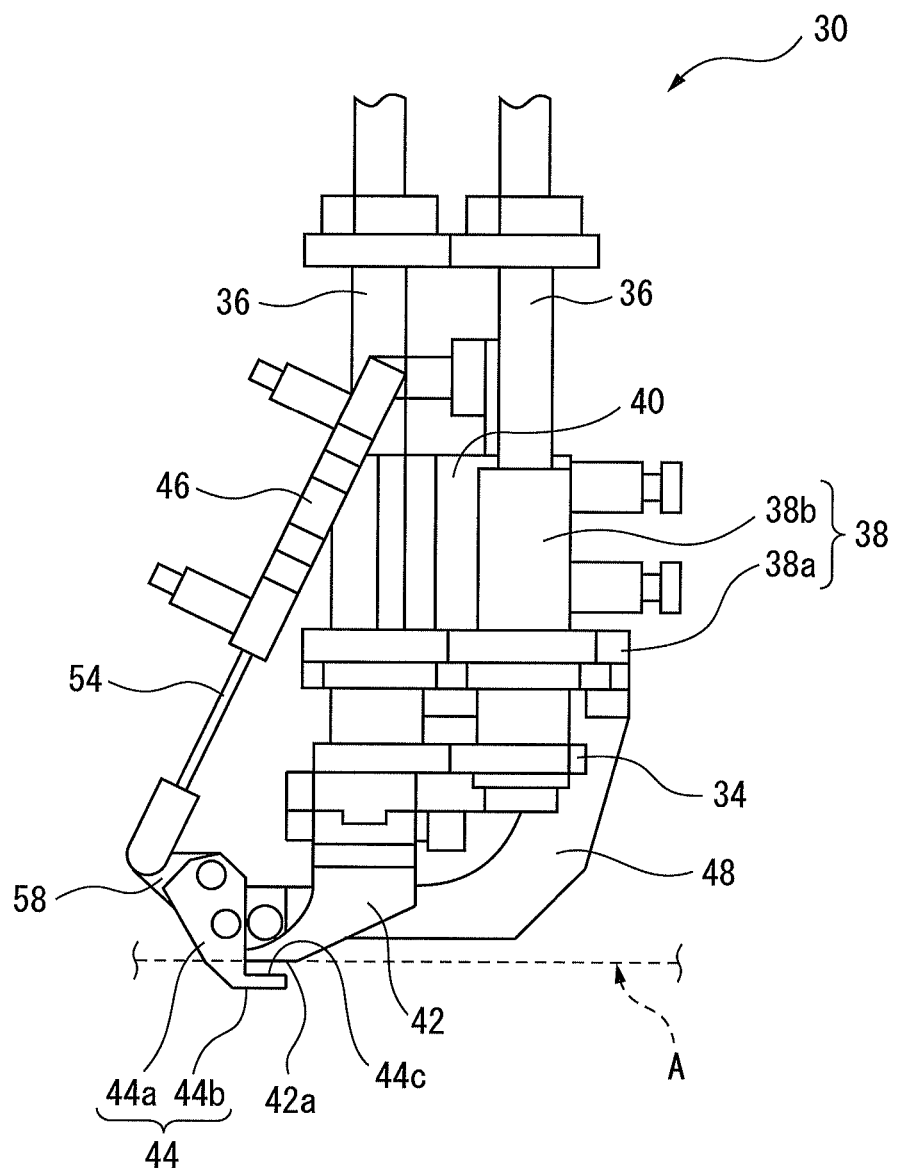
FIG. 9 shows a positional relation between the cutting device and the substrate at a time when determined "YES" at step S22 in FIG. 5.

When determined that the cutting part 44 is properly arranged at the pre-cut position (i.e., determined "YES"), the controller 14 proceeds to step S23. The state at this time is shown in FIG. 9. As shown in FIG. 9, when the cutting part 44 is arranged at the pre-cut position, the distal part 44b of the cutting part 44 is arranged just below the part $A_3$ of the substrate A.

In this stage, the cutting surface 44c of the cutting part 44 is arranged to be separated downward from the cutting surface 42a of the pressing part 42 by a predetermined distance, so that the cutting surface 44c is substantially parallel to the cutting surface 42a (i.e., to the substrate A). On the other hand, when determined that the cutting part 44 is not properly arranged at the pre-cut position (i.e., when determined "NO") at step S22, the controller 14 loops step S22.

At step S23, the controller 14 determines whether or not the force applied from the substrate A to the pressing part 42 is within a predetermined range, similar as above-mentioned step S14. When determined "YES", the controller 14 ends the flow shown in FIG. 5, and proceeds to step S3 shown in FIG. 3. On the other hand, when determined "NO", the controller 14 proceeds to step S24. At step S24, the controller 14 adjusts the pressing force applied from the pressing part 42 to the substrate A, similar as above-mentioned step S15.

Referring to FIG. 3 again, at step S3, the controller 14 cuts the substrate A. This step S3 will be described below with reference to FIG. 6. When step S3 is started, at step S31, the controller 14 drives the first air cylinder 40. Specifically, the controller 14 makes the air pressure inside the first air cylinder 40 to increase.

By this operation, the first air cylinder 40 pushes the pedestal plate 34 downward via the cylinder shaft. At this time, the pressing part 42 contacts the substrate A, while the substrate A is supported by the jig, so the pressing part 42 and the pedestal plate 34 are prevented from moving downward.

Therefore, the first air cylinder 40 is pushed back by the pedestal plate 34, whereby the first air cylinder 40 and a movable part 38 move upward along the support shafts 36. As the movable part 38 moves upward, the cutting part 44, which is supported by the movable part 38 via the support 48, also moves upward together with the movable part 38.

Figure 10:
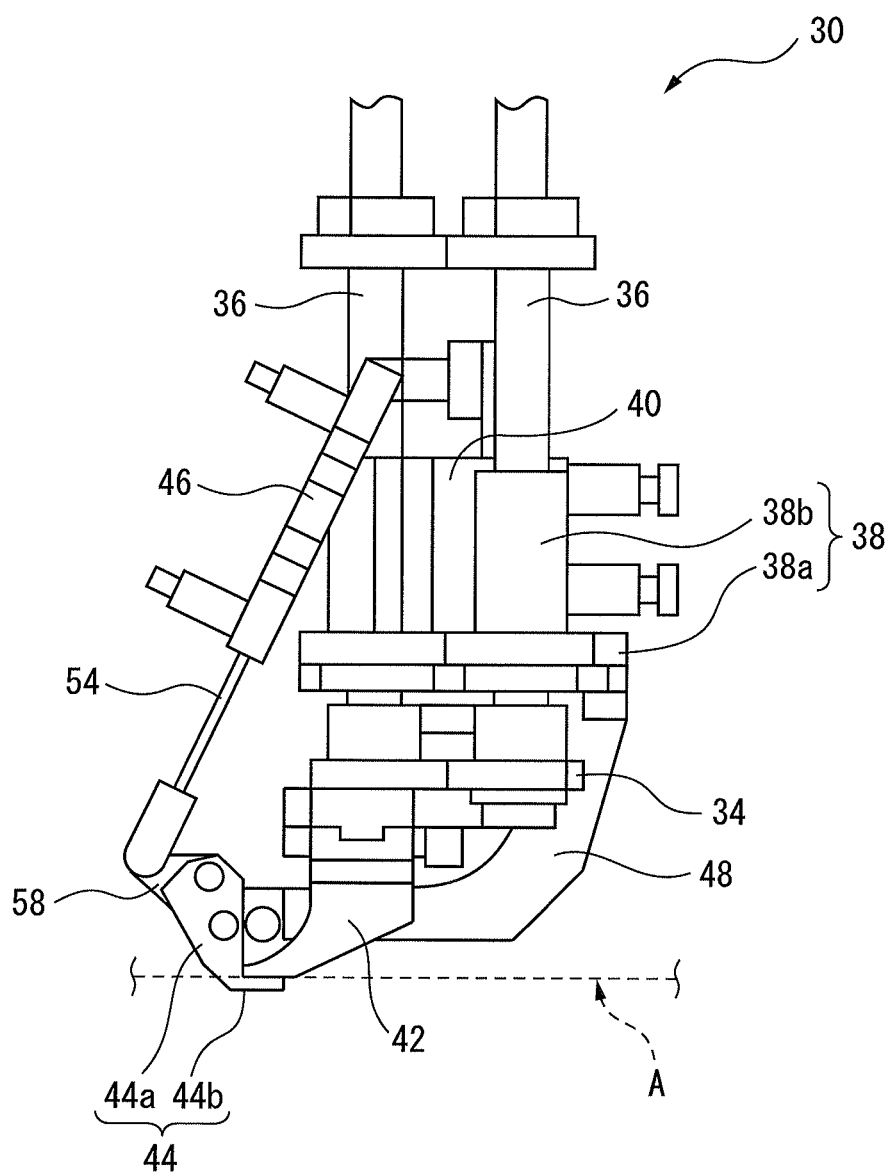
FIG. 10 shows a state where the substrate is sandwiched between the cutting part and the pressing part.

Then, as shown in FIG. 10, the cutting part 44 contacts the lower surface of the part $A_3$ of the substrate A so as to sandwich the part $A_3$ between the cutting part 44 and the pressing part 42 which presses the upper surface of the part $A_3$. As a result, a shearing force is applied to the part $A_3$ so as to shear it.

Thus, in the present embodiment, the cutting part 44 is moved upward by the operation of the first air cylinder 40, whereby the substrate A is sheared. Accordingly, the first air cylinder 40 functions as a second force generation part which generates a driving force for shearing the substrate A at the cutting part 44.

At step S32, the controller 14 determines whether or not the force applied from the substrate A to the pressing part 42 is within the predetermined range, similar as above-mentioned step S14. When determined "YES", the controller 14 proceeds to step S33. On the other hand, when determined "NO", the controller 14 proceeds to step S34.

At step S33, the controller 14 determines whether or not the substrate A is properly cut. For example, the controller 14 may determine whether the part $A_3$ of the substrate A is properly sheared, based on the air pressure inside the first air cylinder 40, the amount of movement of the cylinder shaft, or the amount of movement of the cutting part 44.

Figure 6:
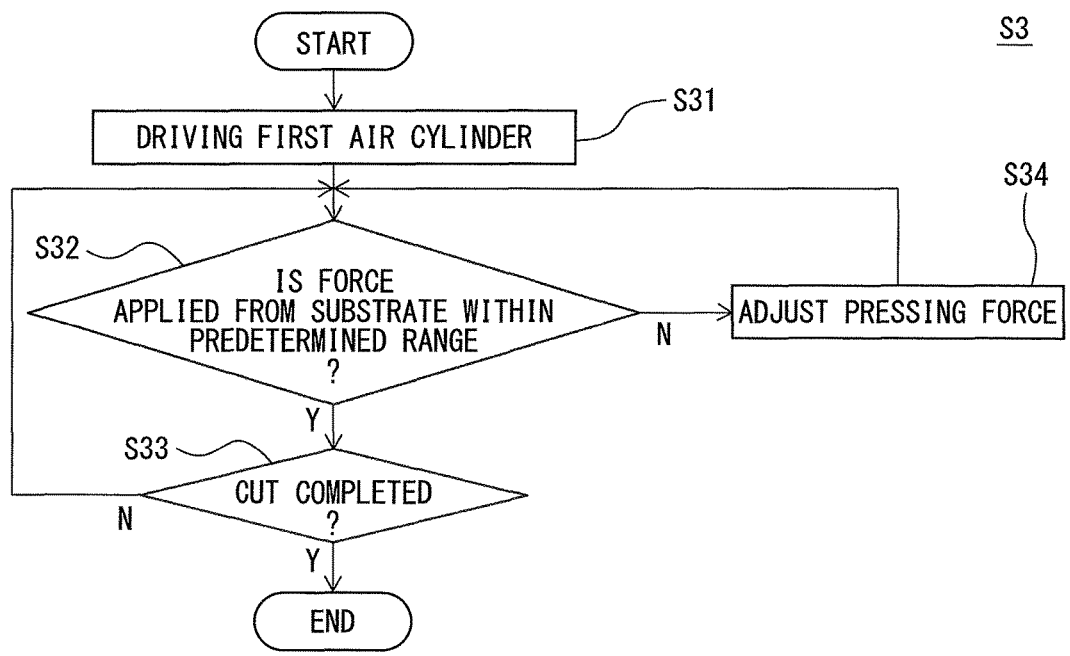
FIG. 6 is a flowchart of step S3 shown in FIG. 3.

When determined "YES", the controller 14 ends the flow shown in FIG. 6, and proceeds to step S4 in FIG. 3. On the other hand, when determined "NO", the controller 14 returns to step S32. Meanwhile, when determined "NO" at step S32, at step S34, the controller 14 adjusts the pressing force applied from the pressing part 42 to the substrate A, similar as above-mentioned step S15.

Referring to FIG. 3 again, at step S4, the controller 14 moves the cutting part 44 to the initial position. Specifically, the controller 14 makes the air pressure inside the second air cylinder 46 to decrease, so as to move the cylinder shaft 54 upward. As a result, the cutting part 44 is rotated about the pin 50 in a direction opposite to that in step S21 (i.e., a clockwise direction when seen from obverse side of FIG. 8).

At step S5, the controller 14 determines whether or not the movement of the cutting part 44 is properly finished. For example, the controller 14 determines whether the movement of the cutting part 44 has properly completed, based on the air pressure inside the second air cylinder 46, the amount of movement of the cylinder shaft 54, or the amount of movement of the cutting part 44.

When determined "YES", the controller 14 proceeds to step S6. At this time, the cutting part 44 is arranged at the position as shown in FIG. 7 (or FIG. 8) with respect to the pressing part 42, whereby the cutting part 44 returns to the initial position. On the other hand, when determined "NO", the controller 14 loops step S5.

At step S6, the controller 14 moves the pressing part 42 away from the substrate A. Specifically, the controller 14 operates the robot arm 22 so as to move the pressing part 42 upward, whereby move the pressing part 42 away from the substrate A.

At step S7, the controller 14 determines whether or not the all cutting operations received from the operator has completed. When determined "YES", the controller 14 ends the flow shown in FIG. 3. On the other hand, when determined "NO", the controller 14 returns to step S1, and executes a subsequent cutting operation on another substrate A.

As described above, in the present embodiment, the controller 14 adjusts the pressing force for pressing the substrate A by the pressing part 42, in response to the reaction force which the pressing part 42 receives from the substrate A when the pressing part 42 is pressed against the substrate A.

Due to this configuration, it is possible to press substrates having different thicknesses with constant pressing force. As a result, it is possible to make the impact applied to each substrate during a cutting operation constant, thereby maintain the performance of components mounted on the substrates.

In addition, in the present embodiment, the pressing part 42 is moved by the robot arm 22. Due to this, it is possible to flexibly adapt to a cutting operation on substrates of various shapes. Furthermore, the pressing part 42 is pressed against the substrate A by means of the robot arm 22, so it is possible to precisely control the pressing force on the substrate A.

Moreover, in the present embodiment, the reaction force applied from the substrate A to the pressing part 42 is measured by the force sensor 62. Due to this, the reaction force can be accurately measured, so it is possible to make the pressing force constant more efficiently.

Figure 11:
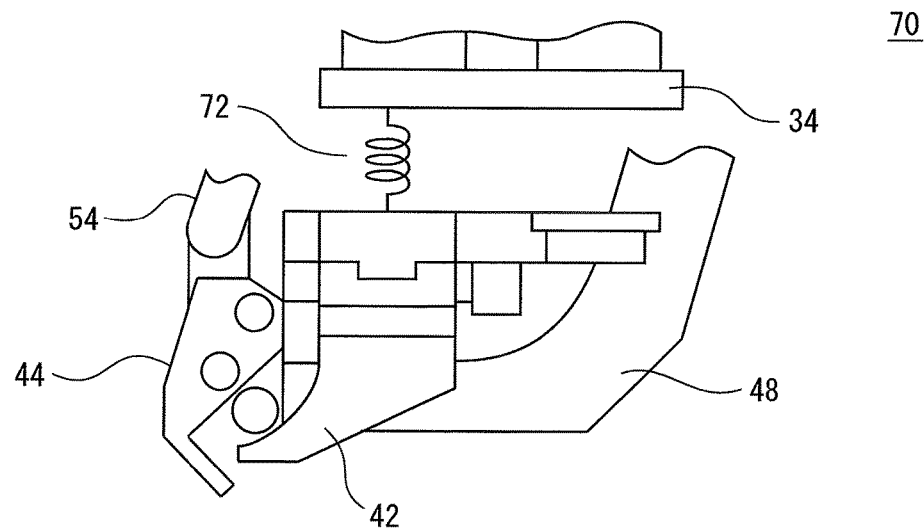
FIG. 11 shows a cutting device according to another embodiment of the invention.

Next, referring to FIG. 11, a cutting device 70 according to another embodiment of the invention will be described. Note that, in various embodiments described below, elements similar to those in the above-mentioned embodiment are assigned the same reference numerals, and detailed descriptions thereof will be omitted.

The cutting device 70 according to the present embodiment may be incorporated in the robot system 10, instead of the cutting device 30 described above. The cutting device 70 differs from the cutting device 30 in that the cutting device 70 further includes a spring 72 arranged between the pedestal plate 34 and the pressing part 42.

The spring 72 elastically deforms when the pressing part 42 is pressed against the substrate A by an operation of the robot arm 22, and presses the pressing part 42 against the substrate A with a predetermined pressing force derived from the elastic restoring force generated at the spring 72. The pressing force applied from the pressing part 42 to the substrate A depends on the amount of deformation of the spring 72.

In this embodiment, in order to adjust the pressing force applied from the pressing part 42 to the substrate A, the controller 14 operates the robot arm 22 so as to move the pedestal plate 34 and the robot arm 22 in a direction toward or away from the substrate A. By this operation, the amount of deformation of the spring 72 can be adjusted, whereby the pressing force by the pressing part 42 can be adjusted.

Thus, in the present embodiment, the pressing part 42 is pressed against the substrate A with a pressing force of a predetermined magnitude by the operations of the robot arm 22 as a moving part and the spring 72. Accordingly, the robot arm 22 and the spring 72 function as a first force generation part which generates the pressing force at the pressing part 42.

Figure 12:
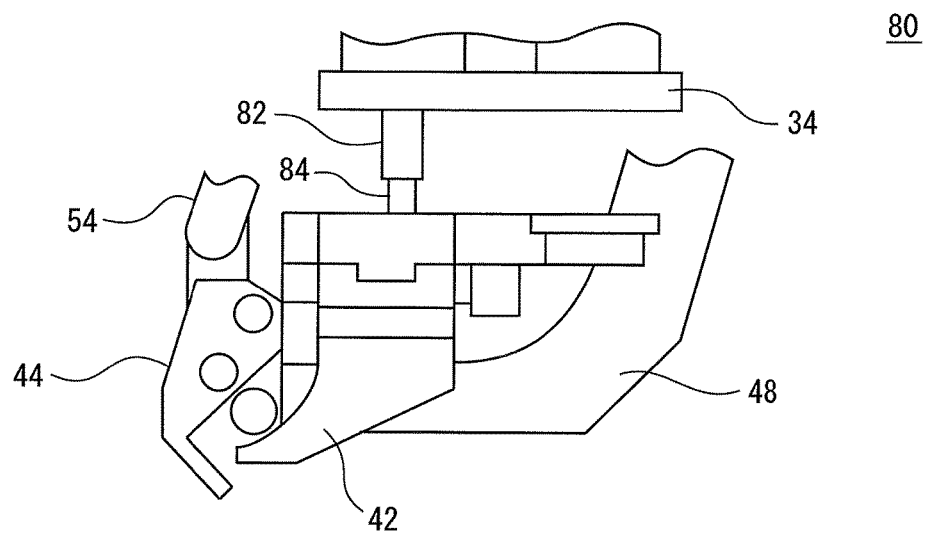
FIG. 12 shows a cutting device according to still another embodiment of the invention.

Next, referring to FIG. 12, a cutting device 80 according to still another embodiment of the invention will be described. The cutting device 80 according to the present embodiment differs from the above-mentioned cutting device 70 in that the cutting device 80 includes a third air cylinder 82 arranged between the pedestal plate 34 and the pressing part 42, instead of the spring 72.

The third air cylinder 82 includes a cylinder shaft 84 which is mechanically connected to the pressing part 42. The third air cylinder 82 moves the cylinder shaft 84 downward and upward in response to a command from the controller 14.

In this embodiment, in order to adjust the pressing force applied from the pressing part 42 to the substrate A, the controller 14 moves the pressing part 42 upward or downward by adjusting a pressure of an air supplied to the third air cylinder 82. Due to this operation, the pressing force by the pressing part 42 can be adjusted. Thus, in the present embodiment, the third air cylinder 82 functions as a first force generation part which generates the pressing force at the pressing part 42.

Figure 13:
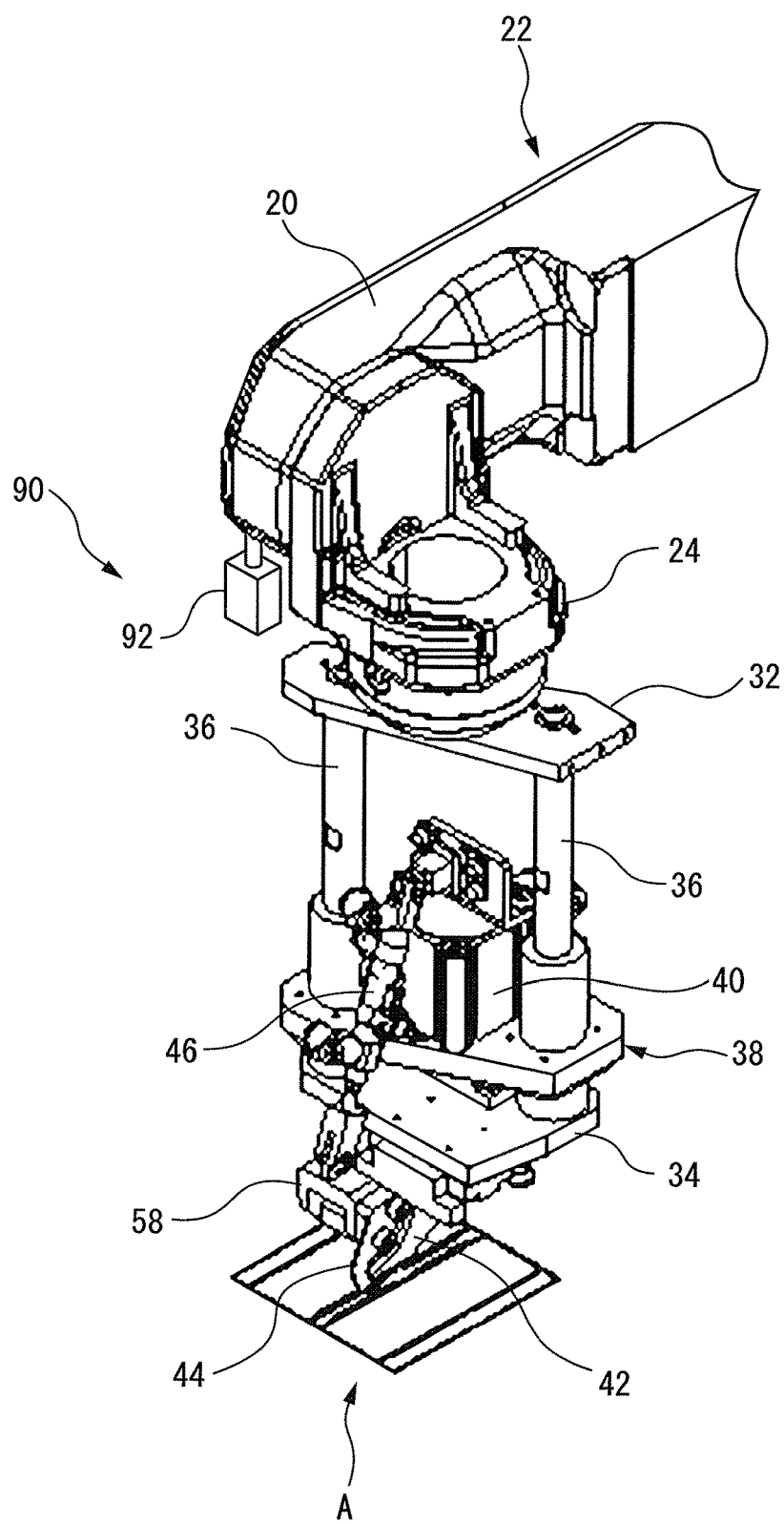
FIG. 13 shows a cutting device according to still another embodiment of the invention.

Next, referring to FIG. 13, a cutting device 90 according to still another embodiment of the invention will be described. The cutting device 90 according to the present embodiment differs from the above-mentioned cutting device 30 in that the cutting device 90 includes a displacement sensor 92, instead of the force sensor 62. The displacement sensor 92 is e.g. an optical-type displacement sensor, and is attached to the robot arm 22. The displacement sensor 92 measures the position of the pressing part 42 with respect to the substrate A.

Next, the operation of the robot system 10 provided with the cutting device 90 will be described below. The operation of the robot system 10 according to the present embodiment differs from the above-mentioned embodiment shown in FIG. 1 in the process at step S14. In particular, at step S14, the controller 14 in this embodiment determines whether or not the force applied from the substrate A to the pressing part 42 is within the predetermined range, based on the position of the pressing part 42 with respect to the substrate A, which is measured by the displacement sensor 92.

As an example, the displacement sensor 92 measures a distance between the displacement sensor 92 and the substrate A, and transmits the measured distance to the controller 14. On the other hand, the controller 14 pre-stores a relative coordinate between the cutting surface 42*a* of the pressing part 42 and the displacement sensor 92. The controller 14 calculates the position of the cutting surface 42*a* with respect to the substrate A, based on the distance between the displacement sensor 92 and the substrate A, which is measured by the displacement sensor 92, and the relative coordinate.

The position of the cutting surface 42*a* with respect to the substrate A correlates with the reaction force applied from the substrate A to the pressing part 42 when pressing the substrate A by the pressing part 42, because it is considered that, when the cutting surface 42*a* is measured to be arranged further downward with respect to the upper surface of the substrate A, the pressing part 42 presses the substrate A with a larger pressing force, as a result of which a larger reaction force would be generated.

According to the present embodiment, the controller 14 determines whether or not the reaction force applied from the substrate A to the pressing part 41, i.e., the pressing force by the pressing part 42, is appropriate, by judging whether the position of the cutting surface 42*a* measured by the displacement sensor 92 is within a predetermined range.

This predetermined range set for the position of the cutting surface 42*a* with respect to the substrate A can be acquired by an experimental method, and pre-stored in the storage built in the controller 14, for example.

The controller 14 determines "YES" when the position of the cutting surface 42*a* with respect to the substrate A is within the predetermined range, and ends the flow shown in FIG. 4, and then proceeds to step S3 in FIG. 3. On the other hand, the controller 14 determines "NO" when the position of the cutting surface 42*a* with respect to the substrate A is out of the predetermined range, and proceeds step S15 in FIG. 4.

Further, in this embodiment, the controller 14 may adjust the driving force supplied from the first air cylinder 40 to the cutting part 44, in response to the thickness of the substrate A. In this case, at step S11, the controller 14 sends a command to the displacement sensor 92 so as to measure a distance between the pressing part 42 and the substrate A, when arranging the pressing part 42 at the predetermined pre-operation position.

On the other hand, the controller 14 pre-stores in the storage a distance between the displacement sensor 92 at the pre-operation position and a jig (not shown) on which the substrate A is placed. The controller 14 can calculate the thickness of the substrate A based on the measured distance between the displacement sensor 92 and the substrate A and on the pre-stored distance between the displacement sensor 92 and the jig.

Then, at step S31, the controller 14 adjusts the air pressure for driving the first air cylinder 40, in order to drive the cutting part 44 with a driving force corresponding to the thickness of the substrate A. Specifically, the controller 14 pre-stores a data table indicating the relationship between the thickness of the substrate A and the air pressure inside the first air cylinder 40.

For example, the air pressure for driving the first air cylinder 40 is set to be proportional to the thickness of the substrate A. In other words, when cutting a substrate of a smaller thickness, the air pressure for driving the cylinder is set to be smaller in order to shear the substrate by the cutting part 44 with a smaller force.

The controller 14 compares the thickness of the substrate A calculated at step S11 with the above data table, and controls the pressure of the air supplied to the first air cylinder 40 so as to drive the first air cylinder 40 with the pressure corresponding to the calculated thickness.

Due to this operation, it is possible to adjust the force for cutting the substrate A in response to the thickness of the substrate A. Thus, in this embodiment, the controller 14 functions as a second adjustment part which adjusts the driving force supplied from the first air cylinder 40 to the cutting part 44.

In addition, in this embodiment, the reaction force applied from the substrate A to the pressing part 42 is measured by the displacement sensor 92. Due to this, the reaction force can be precisely measured, so it is possible to make the pressing force constant more efficiently.

Furthermore, according to this embodiment, the force for cutting the substrate A is adjusted in response to the thickness of the substrate A. Therefore, the impact applied to the substrate A can be reduced more efficiently, so it is possible to maintain the performance of components mounted on the substrates.

Note that, in this embodiment, a case is described where the first air cylinder 40 is applied as a second force generation part for driving the cutting part 44 to cut the substrate A. However, a servo motor may be applied instead of the first air cylinder 40.

In this case, at step S31, the controller 14 may adjust the torque of the servo motor in order to drive the cutting part 44 with a driving force corresponding to the thickness of the substrate A. Due to this, the driving force of the cutting part 44 can be precisely adjusted in response to the thickness of the substrate A, so it is possible to reduce the impact on the substrate A more effectively.

Further, a cutting device may be configured by combining the features of the various embodiments described above. For example, the displacement sensor 92 of the cutting device 90 shown in FIG. 13 may be incorporated in the cutting device 70 shown in FIG. 11. In this case, the controller 14 may calculate the distance between the pedestal plate 34 and the substrate A based on the signal transmitted from the displacement sensor 92.

Then, at step S14, the controller 14 may determine whether the force applied from the substrate A to the pressing part 42 is within the predetermined range, based on the calculated distance. Further, the displacement sensor 92 may be adapted to directly measure the distance between the pedestal plate 34 and the substrate A.

Figure 14:
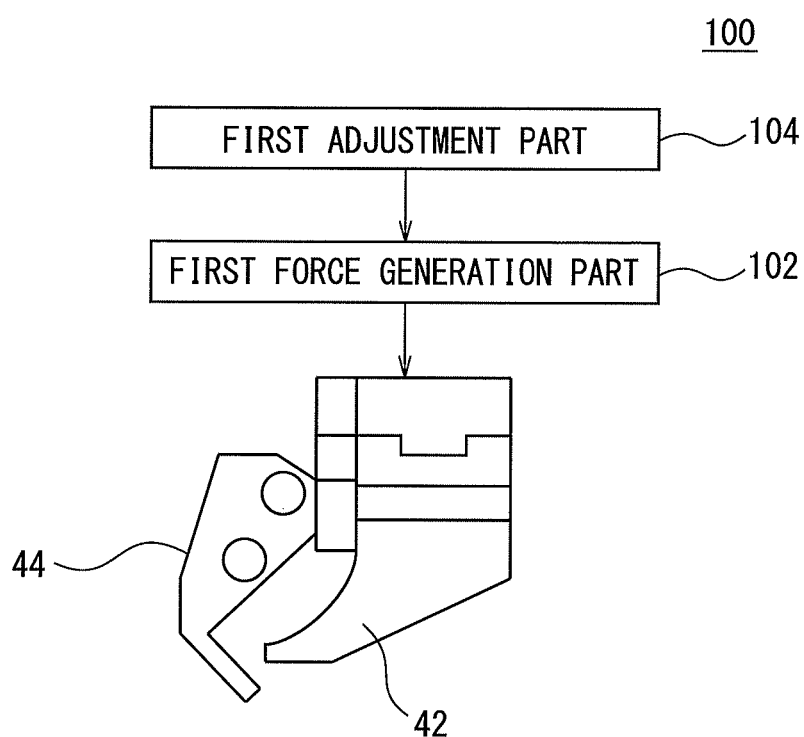
FIG. 14 shows a cutting device according to still another embodiment of the invention.

Further, in the above embodiments, the cutting device 30, 70, 80 or 90 is incorporated in the robot system 10. However, the invention is not limited to such arrangement. Next, a cutting device 100 according to still another embodiment of the invention will be described below with reference to FIG. 14.

The cutting device 100 includes a pressing part 42, a cutting part 44, a first force generation part 102, and a first adjustment part 104. The first force generation part 102 generates a pressing force for pressing the pressing part 42 against a substrate at the pressing part 42. The robot arm 22 in the embodiment shown in FIG. 1 corresponds to the first force generation part 102.

The first adjustment part 104 adjusts the pressing force in response to the reaction force applied from the substrate to the pressing part 42 when the pressing part 42 is presses against the substrate by the first force generation part 102. The controller 14 shown in FIG. 1 corresponds to the first adjustment part 104.

According to the cutting device 100 of this embodiment, it is possible to press substrates having different thicknesses with constant pressing force. As a result, it is possible to make the impact applied to each substrate during a cutting operation constant, thereby maintain the performance of components mounted on the substrates.

The invention described above with the multiple embodiments does not intend to limit the scope of the invention described in the claims. In addition, any combinations of the features described in the present embodiments may be included in the scope of the invention, however, not all the combinations of the features are necessarily essential for a means to solve the problem of the invention. Furthermore, it would be obvious to the person skilled in the art that the embodiments described above may include various modifications or reformations.

Moreover, it is understood that an execution procedure of each processing such as an operation, process, step, course and stage in the device, system, program and method described in the claims, the description and the drawings may be carried out in any order of sequence, unless specified by "before", "prior to" or the like, and unless an output in a preceding process is used in a following process. An operation flow in the claims, the description and the drawings might include "first", "next", "then" or the like, however, such expressions do not mean to restrict any sequence in that order.

The invention claimed is:

1. A cutting device for cutting a substrate, comprising:
a pedestal part;
a pressing device fixed to the pedestal part, the pressing device moveable in a first direction;
a cutting mechanism arranged adjacent to the pressing device and supported by the pedestal part via a moveable part so as to be configured to pivot around a distal end of the pressing device in a second direction opposite the first direction sandwiching a workpiece between the cutting mechanism and the pressing device;
a first force generation mechanism which generates a pressing force for pressing the pressing device against the substrate; and
a controller configured to:
1) increase the pressing force in response to the pressing force being below a first threshold when the pressing device is pressed against the substrate by the first force generation mechanism, and
2) decrease the pressing force in response to the pressing force being above a second threshold when the pressing device is pressed against the substrate by the first force generation mechanism.

2. The cutting device of claim 1 further comprising a force sensor which measures the force applied from the substrate, wherein
the first adjustment part controls the first force generation part so as to adjust the pressing force based on the force applied from the substrate measured by the force sensor.

3. The cutting device of claim 1 further comprising a displacement sensor which measures a position of the pressing part relative to the substrate, wherein
the first adjustment part controls the first force generation part so as to adjust the pressing force based on the position measured by the displacement sensor.

4. The cutting device of claim 1, wherein the first force generation part includes an air cylinder which generates the pressing force,
the first adjustment part adjusts a pressure of an air supplied to the air cylinder.

5. The cutting device of claim 1, wherein the first force generation part includes:
a spring which generates the pressing force; and
a moving part movable in directions toward and away from the substrate, wherein
the pressing part is connected to the moving part via the spring,
the first adjustment part adjusts a position of the moving part relative to the substrate.

6. The cutting device of claim 1 further comprising:
a second force generation mechanism which generates a driving force for shearing the substrate at the cutting mechanism,
wherein the controller adjusts the driving force.

7. The cutting device of claim 6, wherein the second force generation part includes an air cylinder,
the second adjustment part controls a pressure of an air supplied to the air cylinder.

8. The cutting device of claim 6, wherein the second force generation part includes a servomotor,
the second adjustment part controls a torque of the servo motor.

9. The cutting device of claim 6, wherein the controller adjusts the driving force in response to a thickness of the substrate.

10. The cutting device of claim 1, wherein the cutting mechanism includes a saw blade.

11. A robot comprising:
a robot arm; and
the cutting device of claim 1, wherein
the pressing part is provided at the robot arm,
the first force generation part moves the pressing part in directions toward and away from the substrate by an operation of the robot arm.

12. A robot system comprising:
the robot of claim 11; and
a controller which controls the robot.

* * * * *